(12) United States Patent
Zimmermann

(10) Patent No.: US 11,524,787 B2
(45) Date of Patent: Dec. 13, 2022

(54) AIR PASSENGER SEAT COMPRISING A FRAME, AND ROW OF SEATS

(71) Applicant: ZIM AIRCRAFT SEATING GMBH, Immenstaad am Bodensee (DE)

(72) Inventor: Peter Zimmermann, Markdorf (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/711,144

(22) Filed: Apr. 1, 2022

(65) Prior Publication Data

US 2022/0227494 A1    Jul. 21, 2022

Related U.S. Application Data

(63) Continuation of application No. PCT/EP2020/078151, filed on Oct. 7, 2020.

(30) Foreign Application Priority Data

Oct. 8, 2019 (DE) ...................... 10 2019 127 049.9

(51) Int. Cl.
 B64D 11/06 (2006.01)
(52) U.S. Cl.
 CPC ................ B64D 11/0648 (2014.12)
(58) Field of Classification Search
 CPC .................................................. B64D 11/0648
 See application file for complete search history.

(56) References Cited

U.S. PATENT DOCUMENTS

| 6,038,426 | A | 3/2000 | Williams, Jr. |
| 7,399,037 | B2 | 7/2008 | Schumacher et al. |
| 8,393,680 | B2 | 3/2013 | Zimmermann et al. |
| 10,494,104 | B2 | 12/2019 | Jaeger et al. |
| 2003/0080597 | A1 | 5/2003 | Beroth et al. |
| 2015/0284087 | A1* | 10/2015 | Henshaw ............. B64D 11/064 297/316 |

(Continued)

FOREIGN PATENT DOCUMENTS

DE  20 2007 013 159 U1  4/2008
DE  10 2016 102 707 A1  8/2017

(Continued)

OTHER PUBLICATIONS

International Search Report and Written Opinion (Application No. PCT/EP2020/078151) dated Jan. 14, 2021 (with English translation).

(Continued)

Primary Examiner — Justin M Benedik
(74) Attorney, Agent, or Firm — Burr & Brown, PLLC

(57) ABSTRACT

The present invention proposes an air passenger seat comprising a frame that is designed to be fastened to a floor in an air passenger cabin, the frame comprising a seat divider and rails running transversely to the seat direction, wherein: the seat divider is held in place by the rails and is disposed behind a first front rail, which is positioned in front, with regard to the seat direction of the rail; and wherein perpendicular to a plane, which is formed by points for fastening the frame to the floor of an air passenger cabin, is a height difference between the rails so that the rear rail is positioned above the front rail at least by a difference d of 20 mm.

12 Claims, 3 Drawing Sheets

(56) References Cited

U.S. PATENT DOCUMENTS

| | | |
|---|---|---|
| 2017/0021933 A1 | 1/2017 | Pozzi et al. |
| 2019/0002106 A1 | 1/2019 | Stachel et al. |
| 2019/0276153 A1 | 9/2019 | Tranier et al. |
| 2020/0317349 A1 | 10/2020 | Achilles et al. |
| 2021/0179274 A1 | 6/2021 | Lueck et al. |

FOREIGN PATENT DOCUMENTS

| | | |
|---|---|---|
| DE | 10 2017 003 121 A1 | 10/2018 |
| EP | 1 308 344 A2 | 5/2003 |
| EP | 1 600 376 A2 | 11/2005 |
| GB | 811898 | 4/1959 |
| WO | 2009/135669 A2 | 11/2009 |
| WO | 2013/109751 A1 | 7/2013 |
| WO | 2019/074495 A1 | 4/2019 |
| WO | 2019/197329 A1 | 10/2019 |

OTHER PUBLICATIONS

International Preliminary Report on Patentability (in English) (Chapter II) (Application No. PCT/EP2020/078151) dated Dec. 21, 2021.
German Search Report (Application No. 10 2019 127 049.9) dated Sep. 2, 2020.

* cited by examiner

AIR PASSENGER SEAT COMPRISING A FRAME, AND ROW OF SEATS

CROSS REFERENCE TO RELATED APPLICATIONS

This application is a continuation of International Application No. PCT/EP2020/078151 filed Oct. 7, 2020, which designated the United States, and claims the benefit under 35 USC § 119(a)-(d) of German Application No. 10 2019 127 049.9 filed Oct. 8, 2019, the entireties of which are incorporated herein by reference.

FIELD OF THE INVENTION

The present application relates to an air passenger seat comprising a frame, and row of seats.

BACKGROUND OF THE INVENTION

Air passenger seats with one or more seating places are known in a multiplicity of embodiments for the equipping of passenger aircraft, in particular, of long haul aircraft. A seating place conventionally has a seat base and a back rest, wherein normally two or more air passenger seats are connected to form a row of seats.

When designing the air passenger seats, an attempt is made to provide as large a movement space, what is referred to as the "Living Space", for an air passenger, in particular, when air passenger seats are arranged one behind another. For this purpose, for example, elements are shifted into the back rest.

SUMMARY OF THE INVENTION

It is an object of the present invention to provide an improved air passenger seat that, in particular, provides a comparatively larger "Living Space".

The present invention is based on an air passenger seat comprising a frame which is provided for fastening to a floor of an air passenger cabin, wherein the frame comprises a seat divider and struts running transversely with respect to the seating direction, wherein the seat divider is held by the struts and, behind a first strut located in front with respect to a seating direction of the air passenger seat, there is a second strut arranged behind the first strut.

The frame preferably has supporting legs which can be connected to the seat divider. There may be a plurality of seat dividers. For example, two seat dividers are provided for a seat.

The seat has a seat base which is advantageously arranged displaceably on a rail via guide mechanism. Furthermore, the frame can have an, in particular, fixed enclosure of the back rest. The enclosure is configured, for example, as a back rest shell. An extent of the air passenger seat counter to a seating direction can be defined unchangeably in a rear region by means of the back rest shell.

The back rest, in particular, in the region of its upper edge, is advantageously mounted movably on the frame of the air passenger seat, for example, on the back rest shell. The back rest is preferably mounted in such a manner that the back rest can execute a pivoting and displacement movement, in particular, together with the seat base. The back rest here takes up, in particular, different pivot positions, for example, from an upright position into an inclined position.

The essence of the present invention now consists in that, perpendicular to a plane which is formed by fastening points of the frame to the floor of an air passenger cabin, or perpendicular to a cabin floor which in particular runs parallel to the plane through the fastening points, there is a height difference between the struts such that the rear strut is arranged at least 20 mm higher than the front strut. This differential dimension d preferably concerns a central longitudinal axis of the struts. For example, in the case of symmetrical struts, the differential dimension d is preferably based on the axes of symmetry of the struts, i.e. the distance from axis of symmetry to axis of symmetry, which can be the axis of rotation in the case of round tubes. In the case of struts which are not axially symmetrical, the differential dimension is based, for example, on a longitudinal axis, in particular, central longitudinal axis, which runs, for example, through an area center of gravity of the cross section of the strut.

The differential dimension d is preferably at least 25, 30, 35, 40, 45, 50, 55, 60, 65, 70, 75, 80, 85, 90, 95 or 100 mm.

The differential dimension d is, therefore, preferably between 20 and 100 mm. Within this range, a technically expedient seat structure can still be realized.

The struts preferably run parallel to one another.

By means of the arrangement according to the present invention of the struts, namely with a higher rear strut, i.e. a strut in the region of the rear side of the seat, an air passenger facing this rear side, in a row of seats behind it, obtains a larger movement space for his/her legs with respect to the air passenger seat positioned in front, in particular, in the region of the rear strut of the air passenger seat.

The struts preferably run perpendicularly to the seat divider or perpendicularly to a plurality of seat dividers.

In the case of known configurations, the rear strut is normally either at the same height as the front strut or is located even lower. Therefore, the positioning of the rear strut for the seat in this region takes up more space which is not available for an air passenger seat located there, unlike in the solution according to the present invention.

In a furthermore preferred refinement of the present invention, the first and second strut have different cross sections. In the case of rotationally symmetrical struts, the diameters preferably differ. With regard to the cross section, preferably for a hollow strut, the area is understood as being the area which is assembled from the wall cross section and the region of the area that is enclosed by a wall of the strut.

Furthermore, it is advantageous if the first strut has a larger cross section than the second strut. In particular, the first strut has a larger diameter than the second strut.

In this way, the space required by the second strut can be reduced further and therefore the "Living Space" available for an air passenger seat can be increased further.

In a preferred refinement of the present invention, the diameter of the first strut is 20, 30, 40, 50, 60, 70, 80, 90, 100, 110, 120, 130, 140 or 150% greater than the second strut. The rear strut has, for example, an absolute diameter of 25-40 mm, in particular, a diameter of approx. 35 mm.

The front strut has, for example, a diameter of 40-60 mm, in particular of 45-55 mm, for example approximately 50 mm.

Furthermore, it is of advantage if the materials of the first strut and of the second strut differ. It is therefore advantageously also possible for the dimensioning thereof, in particular, the diameter of the struts, to have been influenced.

The front strut which is located in front is preferably made from aluminum or titanium. The rear strut is, for example, made from steel. It is therefore possible to select a comparatively small diameter with high strength of the rear strut. The use of titanium at the rear strut is also conceivable, and therefore, with high strength, small dimensioning of the strut is possible, with a comparatively small cross section or a comparatively small diameter.

In a preferred refinement of the present invention, at least one strut is an elongate hollow body. Therefore, with high rigidity, a comparatively low weight of a strut can also be realized, especially if the front and the rear strut are configured in the form of hollow bodies. The hollow body is preferably a tube. The front and the rear strut can be configured in the form of a tube, in particular, a round tube.

It has also proven advantageous that the distance of the second rear strut in the perpendicular direction from a plane which is formed by fastening points of the frame on the floor of an air passenger cabin (mounting plane) or in the perpendicular direction from a cabin floor is greater than 280 mm. A flat cabin floor corresponds to a plane which is formed by fastening points of the frame to the floor of an air passenger cabin or is parallel thereto.

In order to provide yet more leg room for an air passenger sitting behind an air passenger seat according to the present invention, the distance of the second rear strut in the perpendicular direction is advantageously greater than 290 mm, 300 mm, 310 mm, 320 mm, 330 mm or 340 mm.

The distance of the front first strut in the perpendicular direction from a cabin floor is preferably, for example, smaller than 280 mm, 270 mm, 260 mm, 250 mm or 240 mm.

The distances preferably refer to a longitudinal axis, for example, central longitudinal axis, in particular, axis of symmetry, for example, axis of rotation of the struts.

A distance of the struts from one another parallel to the cabin floor or to a mounting plane is preferably less than 260 mm, 250 mm, 230 mm or 220 mm.

The distance is advantageously approximately 247 mm.

A further essential aspect of the present invention concerns a row of seats comprising at least two air passenger seats according to one of the preceding aspects.

In this refinement, it is preferred if at least two air passenger seats each have a common first strut running through them and preferably a second strut running through them. Four seat dividers are advantageously provided, two for each seat on the first and second struts running through it.

In principle, it is preferred if the seat dividers are different from possible guide rails for a possible movably mounted seat base or from an enclosure in the region between the struts. A seat divider preferably has fastening points, for example, in the form of screw connections, at the struts.

For example, an enclosure for the back rest is mounted on the seat divider. The guide rail for a movably mounted seat base is advantageously a separate component with respect to the seat divider. Both elements are advantageously mounted on the struts.

The seat dividers are attached to the struts preferably via a disk hub connection.

The seat divider is preferably a component with a multiplicity of cutouts in its surface to reduce weight and form a lattice-like brace or web structure.

The seat dividers advantageously differ from foot parts which form and optionally connect the frame below the struts, i.e., for example, provide a connection of front and rear strut below the struts.

In an advantageous refinement, the air passenger seat comprises a foldable leg rest connected to a seat base.

BRIEF DESCRIPTION OF THE DRAWINGS

An exemplary embodiment of the present invention will be explained in more detail below with reference to schematic drawings, and further advantages will be mentioned.

DETAILED DESCRIPTION OF THE INVENTION

Figure 1:
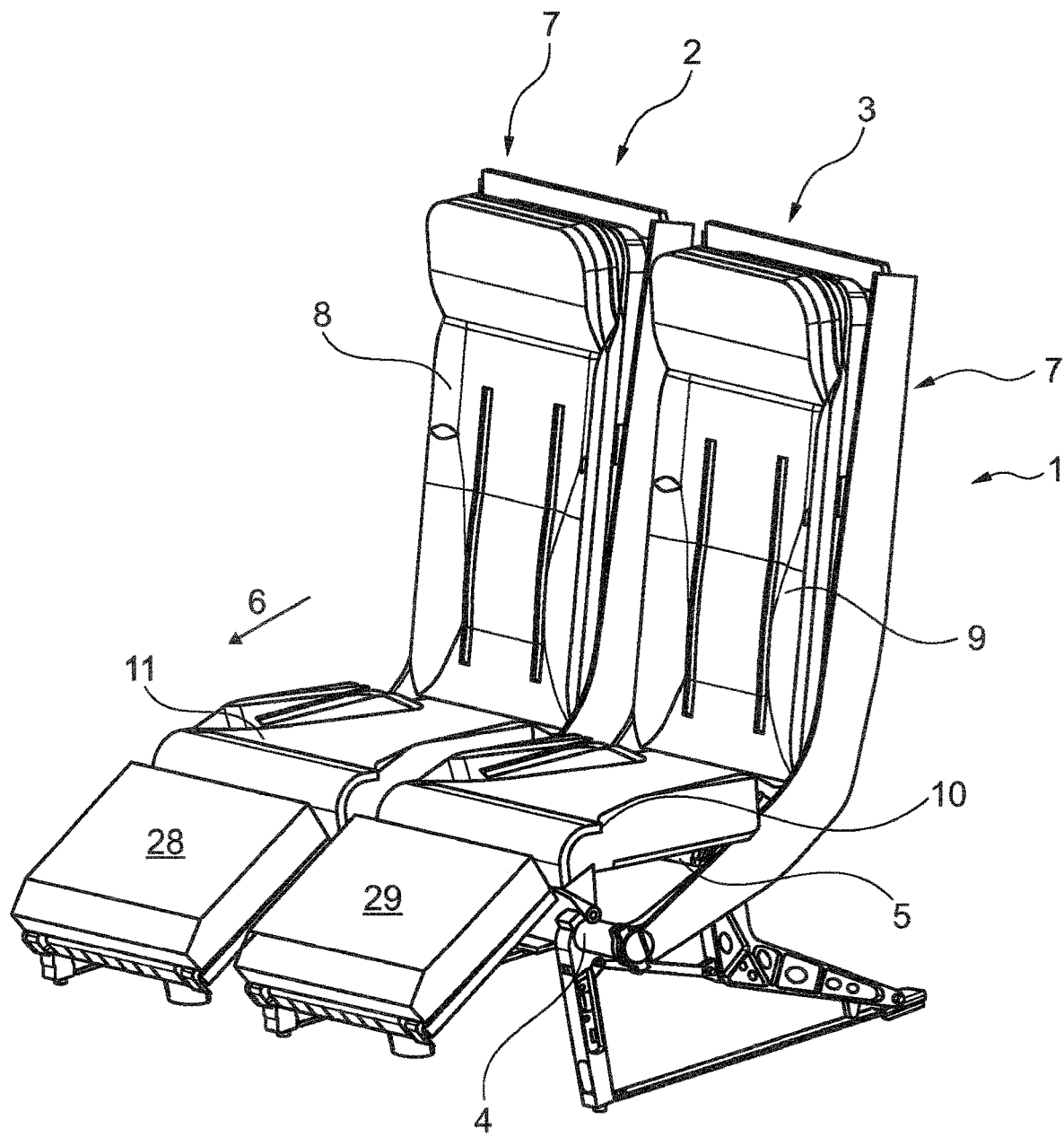
FIG. 1 shows, in a perspective view, a row of seats comprising two air passenger seats with an adjustable leg rest, with the enclosure of the back rest partially illustrated and cutaway.

FIG. 1 shows a row of seats 1 comprising two air passenger seats 2, 3.

The air passenger seats 2, 3 comprise, for example, two supporting tubes 4, 5, the front supporting tube 4 and the rear supporting tube 5 with respect to a seating direction 6.

Figure 2:
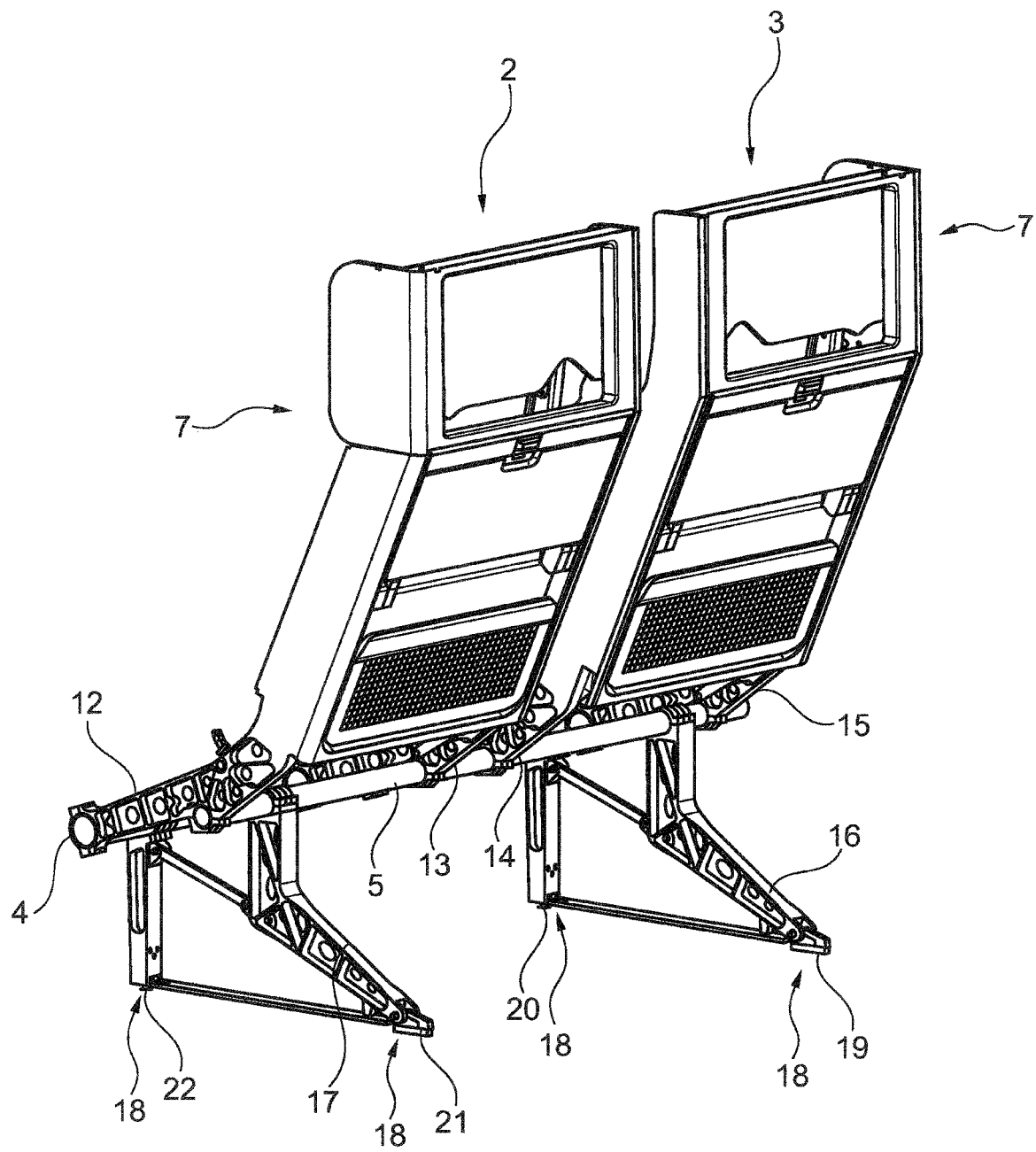
FIG. 2 shows, in a perspective view obliquely from the rear, the pair of seats according to FIG. 1 with part of an enclosure for a back rest, without back rest, seat base and leg rest.

The seats 2, 3 have an enclosure 7 which is in each case illustrated schematically only partially and cutaway in FIGS. 1 and 2. A back rest 8, 9 is arranged in a shell form of the respective enclosure 7. In order to set different tilting positions, the back rest 8, 9 is preferably guided movably in the enclosure, for example together with a displaceably mounted seat base 10, 11. A foldable leg rest 12, 13 for the respective air passenger seat 2, 3 is advantageously provided downwardly adjoining the seat base 10, 11.

The supporting tubes 4, 5 are continuous for both air passenger seats 3, 4 and are used by the air passenger seats 3, 4 as a common mounting element. Supporting tubes assigned only to one air passenger seat are also conceivable.

Seat dividers 12, 13, 14, 15 are mounted on the supporting tubes 4, 5 via, for example, a screw connection, for example, a disk hub connection. Supporting legs 16, 17 are likewise, for example, screwed to the supporting tubes 4, 5.

The respective lower end region 18 of the supporting legs 16, 17 comprises mounting points 19, 20, 21, 22 for mounting on a cabin floor. The exemplary embodiment is based on a flat cabin floor with the supporting tubes 4, 5 running parallel thereto, and, therefore, the mounting points 19, 20, 21 and 22 define a mounting plane 23 with the supporting tubes 4, 5 likewise running parallel thereto.

Figure 3:
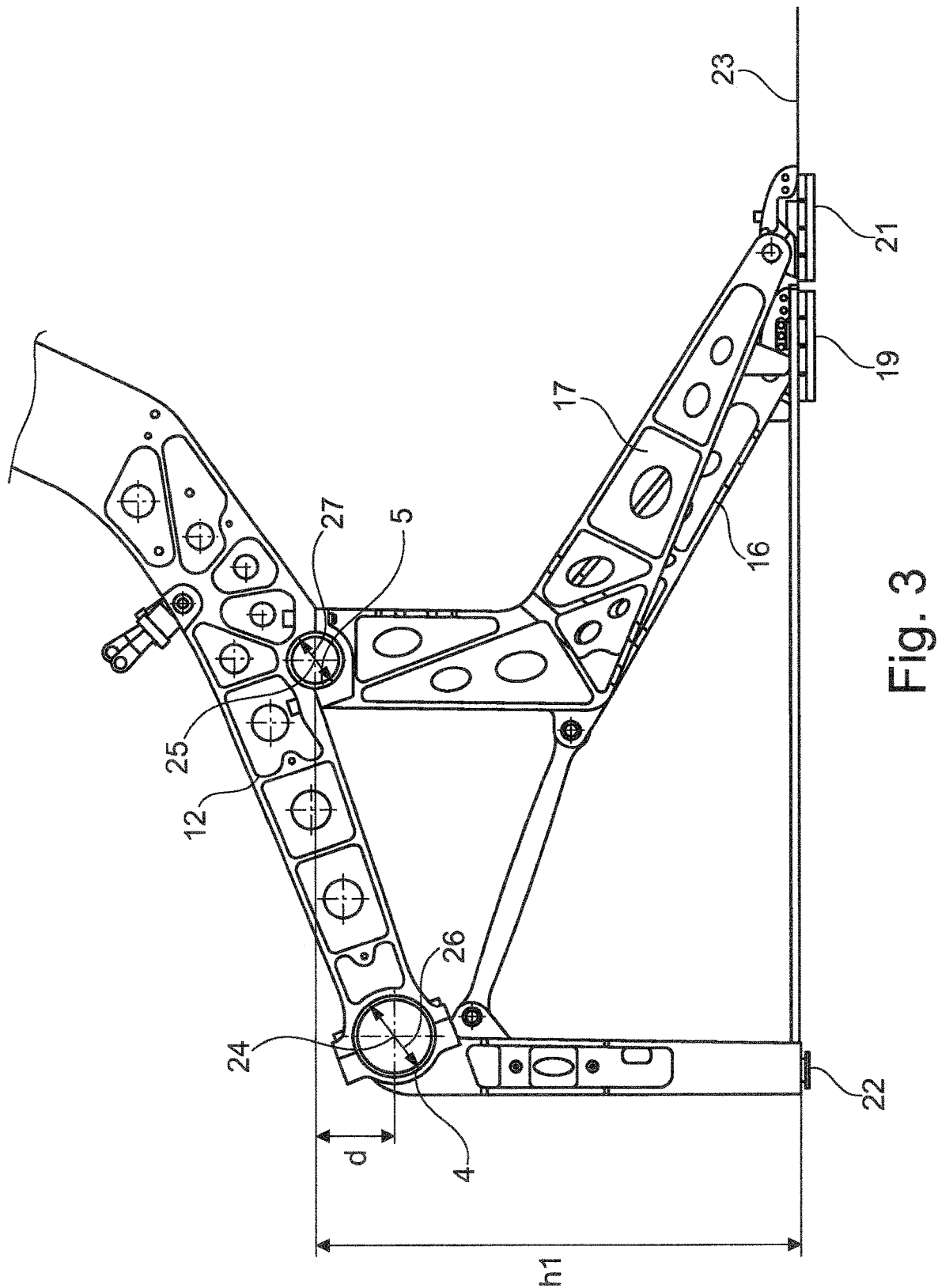
FIG. 3 shows a seat divider for an air passenger seat according to FIGS. 1 and 2 with supporting legs and struts in a schematic detailed view from the side.

The position of the supporting tubes 4, 5 on the supporting legs 16, 17 and, therefore, with respect to the mounting plane 23, which normally corresponds to the cabin floor, can be seen in FIG. 3. In addition, the seat divider 12 is illustrated in this view.

As illustrated in the exemplary embodiment, the supporting tubes 4, 5 are preferably round tubes and have an axis of symmetry or axis of rotation 24, 25. A height h1 of the rear supporting tube 5 perpendicular to the mounting plane 23 or the cabin floor can be seen in FIG. 3. The height difference between the front supporting tube 4 and the rear supporting tube 5 likewise in the perpendicular direction to the mounting plane 23 has the value d. In the exemplary embodiment, the value d is 50 mm, but, as explained in the general description, can have the appropriate values beginning from 20 mm and leading toward a greater difference.

In the exemplary embodiment, the height h1 is 307 mm, but can also lie in the value ranges explained in the general description, beginning with 280 mm.

By means of the positioning according to the present invention, in particular, of the rear supporting tube 5, the air passenger seat in this region extends less far toward a cabin floor, and therefore more freedom of movement and thus "Living Space" is available there for an air passenger.

In addition, this effect is also improved by the fact that a diameter 27 of the rear supporting tube 5 is significantly smaller than a diameter 26 of the front supporting tube 4. In the exemplary embodiment, the diameter 27 is approx. 35 mm and the diameter 26 is approx. 50 mm. The further values cited in the general description are likewise conceivable here.

LIST OF REFERENCE SIGNS

1 Row of seats
2 Air passenger seat
3 Air passenger seat
4 Supporting tube
5 Supporting tube
6 Seating direction
7 Enclosure
8 Back rest
9 Back rest
10 Seat base
11 Seat base
12 Seat divider
13 Seat divider
14 Seat divider
15 Seat divider
16 Supporting legs
17 Supporting legs
18 Lower end region
19 Mounting point
20 Mounting point
21 Mounting point
22 Mounting point
23 Mounting plane
24 Axis of symmetry
25 Axis of symmetry
26 Diameter
27 Diameter
28 Leg rest
29 Leg rest

The invention claimed is:

1. A row of seats comprising at least two air passenger seats, wherein each air passenger seat has a frame which is provided for fastening to a floor of an air passenger cabin, wherein the frame comprises a seat divider, wherein the row of seats comprises a first strut running transversely with respect to the seating direction and a second strut running transversely with respect to the seating direction, wherein the seat dividers of the frames of the at least two air passenger seats are held by the struts and, behind the first front strut which is located in front with respect to the seating direction of the air passenger seat, there is the rear second strut located behind the first strut, wherein each air passenger seat has a seat base and a back rest, wherein the seat base is mounted displaceably on a guide rail via guide mechanism, wherein the back rest is mounted movably on the frame such that the back rest together with the seat base can execute a pivoting and displacement movement, wherein, perpendicular to a plane which is formed by fastening points of the frame to the floor of an air passenger cabin, there is a height difference between the first and the second strut in such a manner that the rear second strut is located above the front first strut at least by a differential dimension d of 20 mm, wherein the differential dimension d refers to a height difference of a central longitudinal axis of the first strut to a central longitudinal axis of the second strut, wherein the guide rail is present as a separate component from the seat divider, wherein the guide rail is mounted on the first and on the second strut.

2. The row of seats as claimed in claim 1, wherein the frame has an enclosure of the back rest.

3. The row of seats as claimed in claim 1, wherein each air passenger seat comprises two seat dividers.

4. The row of seats as claimed in claim 1, wherein the first and second strut have different cross sections.

5. The row of seats as claimed in claim 1, wherein the first strut has a larger diameter than the second strut.

6. The row of seats as claimed in claim 1, wherein the diameter of the first strut is 20% larger than the diameter of the second strut.

7. The row of seats as claimed in claim 1, wherein the materials of the first strut and of the second strut differ.

8. The row of seats as claimed in claim 1, wherein the first strut is composed of aluminum or titanium and the second strut of steel or titanium.

9. The row of seats as claimed in claim 1, wherein at least one strut is an elongate hollow body.

10. The row of seats as claimed in claim 1, wherein at least one strut is a round tube.

11. The row of seats as claimed in claim 1, wherein the distance h1 of the second rear strut in the perpendicular direction from a plane which is formed by fastening points of the frame on the floor of an air passenger cabin is greater than 280 mm.

12. The row of seats as claimed in claim 1, wherein the at least two air passenger seats each have a first and second strut jointly running through them.

* * * * *